June 5, 1956
F. McCLUSKY
2,748,516
CHRISTMAS TREE MAT
Filed July 19, 1954
2 Sheets-Sheet 1
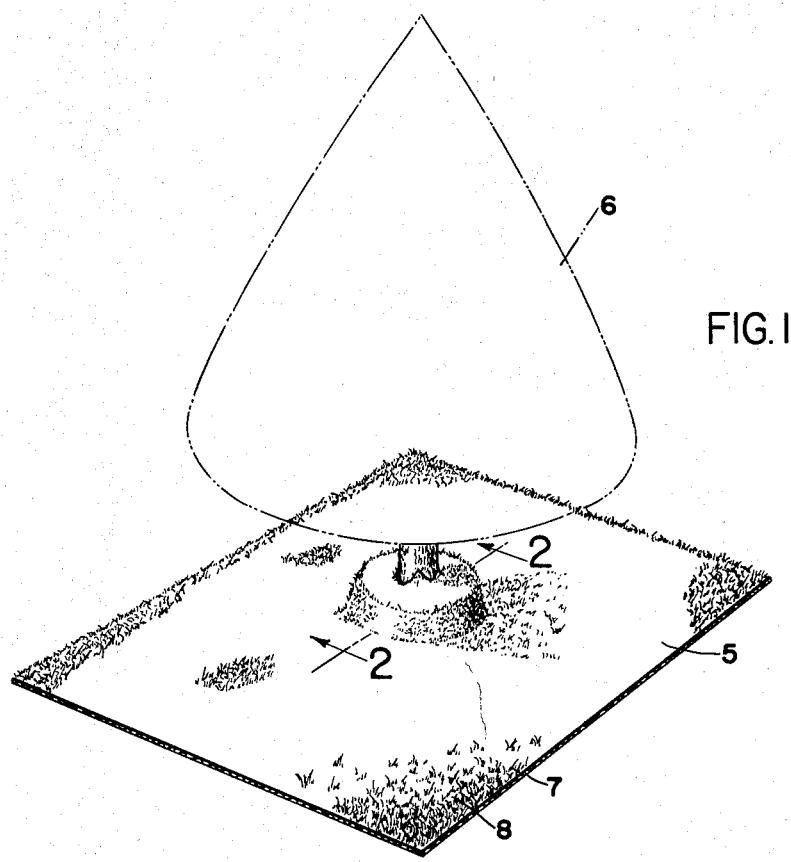
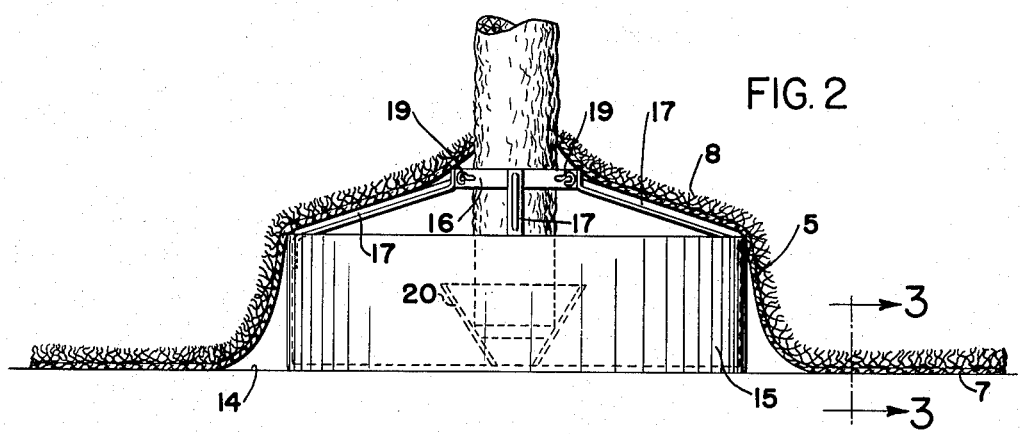
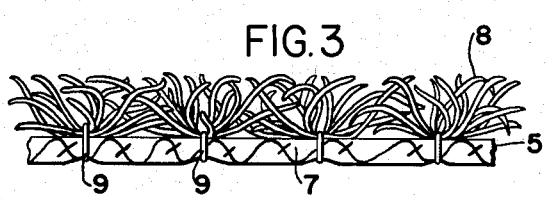
INVENTOR.
FRANK McCLUSKY
BY
ATTORNEY June 5, 1956  F. McCLUSKY  2,748,516
CHRISTMAS TREE MAT Filed July 19, 1954  2 Sheets-Sheet 2

INVENTOR.
FRANK McCLUSKY
BY
ATTORNEY

United States Patent Office 2,748,516
Patented June 5, 1956

2,748,516

CHRISTMAS TREE MAT

Frank McClusky, Cuyahoga Falls, Ohio

Application July 19, 1954, Serial No. 444,290

3 Claims. (Cl. 41—15)

This invention relates to the use of a mat under a Christmas tree, which entraps needles shed by the tree. The mat is decorative and covers the Christmas tree standard.

The mat may be made of any suitable material, but is preferably made of artificial grass, i. e. a fabric to one surface of which many narrow, relatively short strips of raffia have been stitched near their middles leaving their extremities unattached. This mat is not only decorative, but the surface is shaggy and capable of entrapping needles shed by the tree. The raffia is preferably grass green, but may be white, blue, yellow or any color.

Any standard may be used for supporting the tree. Preferably, there is an opening in the mat through which the trunk of the tree is put before the tree is placed in the standard. Thus the mat extends outwardly from the trunk, covering the standard and the adjoining surface of the floor or table or the like on which the standard is placed.

The invention will be further described in connection with the accompanying drawings, in which—

Fig. 1 is a view in perspective of a Christmas tree in a standard with the mat in place;

Fig. 2 is a section on the line 2—2 of Fig. 1, on an enlarged scale, showing the standard, etc.;

Fig. 3 is a detail on the line 3—3 of Fig. 2, showing the construction of the mat;

Figure 4:
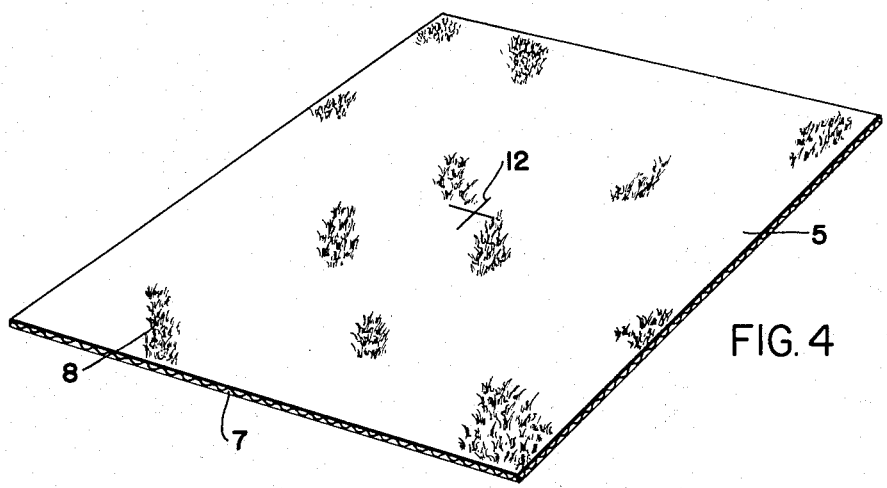
Fig. 4 is a view of the mat showing the preferred type of opening.

The mat 5, under the Christmas tree 6, as illustrated in Figs. 1-4, is preferably made from burlap 7 (Fig. 3) or other coarse fabric, to which relatively narrow pieces of raffia 8 are stitched. These pieces need not be all the same size. They may, for example, vary from one-half to three or four inches in length and one-sixteenth to three-quarters inch in width. The ends of the raffia may become frayed when the mat is used, and may even be frayed when the mat is new. They are arranged generally in rows and stitched to the fabric by stitchings 9 which are generally three-quarters to one and one-half inches apart. Alternatively, the stitchings may be spiral. The stitchings attach the pieces of raffia to the fabric at their middles leaving their extremities unattached. They overlap and intermingle, so that the surface of the fabric is covered with a disorderly looking, shaggy coating. The opening for the trunk is preferably provided by cutting the mat with a cross 12 (Fig. 4) near its center. Each cut of the cross is several inches long, e. g. three or four inches, to receive the trunk of a tree of any size up to several inches in diameter. This permits coverage by the mat up to the tree trunk 13, regardless of the size of the trunk. The corners formed by the cross may be folded up against the trunk, as in Fig. 1, or they may be turned under. The mat thus extends outwardly from the tree trunk, over the standard, and beyond this on to the surface 14 of the floor or table or the like which supports the standard.

As the needles are shed from the tree they become entrapped in the raffia, and are thus confined to the area of the mat. They readily settle between the pieces of raffia, even penetrating the mat to the fabric. Thus they are not readily seen even though the raffia be some color other than that of the needles. After use, the needles are readily removed by shaking the mat.

In Figs. 1-4 the standard is a metal vessel 15, with a ring 16 supported centrally thereof by braces 17. Screw eyes 19 in the ring may be turned in or out to support a tree having a trunk of any diameter. The tree rests in the water-holder 20. When covering the standard, the mat will not lie perfectly flat, but that is immaterial.

Figure 5:
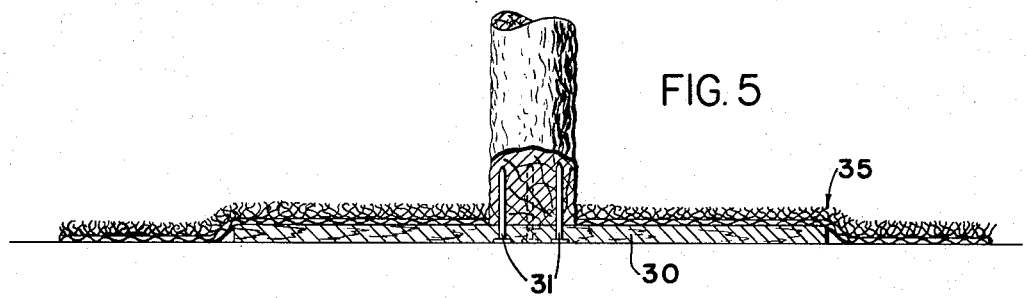
Fig. 5 is a section through an alternative arrangement.
Figure 6:
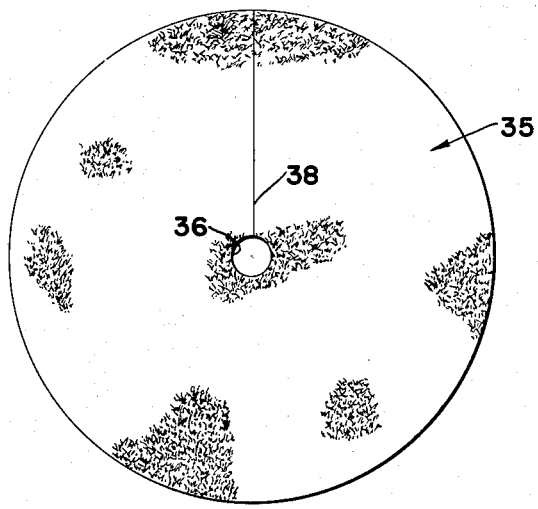
Fig. 6 is a plan view of the mat shown in Fig. 5.

Figure 5 illustrates a flat board 30 fastened to the bottom of the tree trunk by the long nails 31. A plan view of the mat 35 is shown in Fig. 6. It is round, provided with a circular hole 36 in the middle, and a slit 38 extends from the hole to one edge of the mat. This mat may be laid around the tree after the tree has been erected, supported by a standard.

Different types of standards may be used. The mats may be of different sizes ranging from about one foot across for very small treees up to several feet across for the larger trees.

What I claim is:

1. In combination, a natural Christmas tree bearing needles and severed from its roots, a standard which supports the tree, and a mat covering the standard and extending outwardly from the trunk of the tree which mat has a shaggy surface of pieces of raffia attached to a fabric base and capable of entrapping needles shed by the tree.

2. In combination, a natural Christmas tree bearing needles and severed from its roots, a supporting surface with a standard thereon which supports the tree, and a mat, which mat has a shaggy surface of pieces of raffia attached between their ends to a fabric base, which mat is capable of entrapping needles shed by the tree, the mat having an opening in it in which the tree is located and extending outwardly over the standard and on to the adjoining surface.

3. In combination, a natural Christmas tree bearing needles and severed from its roots, a supporting surface with a standard thereon which supports the tree; and fabric around the tree, covering the support and extending from the trunk of the tree on to the adjoining surface, the upper surface of which fabric is covered with many narrow, relatively short strips of raffia attached thereto near their middles leaving both of their extremities unattached whereby the raffia-covered fabric is capable of entrapping needles shed by the tree.

References Cited in the file of this patent

UNITED STATES PATENTS

| 1,130,545 | Scott | Mar. 2, 1915 |
| 1,386,450 | Tully | Aug. 2, 1921 |
| 1,882,986 | Schroeder | Oct. 18, 1932 |
| 2,029,343 | Sperr | Feb. 4, 1936 |

FOREIGN PATENTS

| 575,889 | France | May 1, 1924 |
| 700,077 | Germany | Apr. 21, 1937 |